Jan. 26, 1965 S. M. OSTER ETAL 3,167,618

MAGNETIC RECORDER HEAD ASSEMBLY

Filed July 30, 1959 2 Sheets-Sheet 1

*INVENTORS*
MARK L. NAIMAN
STANLEY M. OSTER

William G. Miller Jr.

*AGENT*

MAGNETIC RECORDER HEAD ASSEMBLY

Filed July 30, 1959 2 Sheets-Sheet 2

"H" LAMINATION

"C" LAMINATION

*INVENTORS*
MARK L. NAIMAN
STANLEY M. OSTER
William G. Miller Jr.
*AGENT*

United States Patent Office 3,167,618

Patented Jan. 26, 1965

3,167,618
MAGNETIC RECORDER HEAD ASSEMBLY

Stanley M. Oster, Letchworth, Herts, England, and Mark L. Naiman, Philadelphia, Pa., assignors to Sperry Rand Corporation, New York, N.Y., a corporation of Delaware Filed July 30, 1959, Ser. No. 830,544
12 Claims. (Cl. 179—100.2)

This invention relates to electromagnetic transducer heads of the type utilized for recording and reproducing on a magnetizable medium. More specifically, this invention concerns head structures for recording, reproducing, and erasing magnetic records.

In the past, there have been utilized assemblies of electromagnetic transducer heads, commonly referred to as magnetic heads, wherein separate magnetic circuits having gaps of different widths (that is, width is the dimension corresponding to the width of the channel, or to that dimension transverse to the direction of relative movement between head and medium) have been utilized for each of the separate functions of recording, reproducing, and erasing. Assemblies of this type have usually required precise assembly for proper alignment of their respective parts. Also, these magnetic heads have generally been under the control of separate transducer coils. Magnetic heads having gaps of different widths have generally been found useful where the record member carrying the magnetic record would traverse the recording, reproducing, and erasing heads in such a manner that there was a positional error developed. This error tends to develop because of mechanical tolerances, such as by a shift in the position of the recording member with relation to the head structures between performances of the several functions. Such positional error, unless compensated by the different widths of the gaps, causes the reproducing head to receive something less than the maximum possible signal from the record member. Also, the erasing precedure, without this compensation, results in the erasure of something less than the full width of the recorded channel.

It is an object of this invention to provide a new and improved magnetic head structure.

Another object of this invention is the provision of a new and improved recording and reproducing magnetic head in which the recording function and the reproducing function are accomplished over channels of different widths to avoid the effects of positioning errors.

Another object of this invention is the provision of a new and improved magnetic head structure selectively providing the recording, reproducing, and erasing functions by a single transducer coil.

Another object of this invention is the provision of a new and improved head structure which does not require a high accuracy in alignment of its parts.

Another object of this invention is the provision of a new and improved head structure which allows recording of a narrower band than that covered during the reproducing and erasing functions.

Still another object of this invention is the provision of a new and improved head structure which allows the reproduction of recorded signals from a narrower band than that which is covered during the recording function.

Another object of this invention is the provision of a new and improved magnetic head structure having two gaps each covering a channel of different width, which gaps can be selectively utilized in conjunction with a single transducer coil.

Still another object of this invention is the provision of a new and improved assembly of a plurality of magnetic heads.

In accordance with this invention, there is provided an improved electromagnetic transducer or magnetic head structure that may be used selectively to perform the recording, reproducing, and erasing functions with gaps of differing widths, and that does not require a high precision during assembly. This transducer comprises a magnetic core structure which forms a first and a second series magnetic circuit having a common portion in a central core. The structure of the central core forming the common portion of the magnetic circuits may be arranged in one embodiment of this invention to have a pole face width at the gap formed with one separate auxiliary core which is greater than the width of the pole face forming the gap with another separate auxiliary core. Such a transducer thus covers a narrower channel for one function of the transducer than the channel covered for other functions, thereby allowing for possible positional errors between the transducer and the record member as between separate passages of the record member past the transducer. In an embodiment of the invention, a common core portion is linked by a transducer coil, and each of the series magnetic circuits is completed through separate cores which are themselves each linked by a control coil. The separate cores are so oriented in relation to the central core structure as to provide between confronting pole faces of the separate cores and the central core separate non-magnetic gaps in each of the series circuits.

Energization of the transducer coil generates magnetic flux which is selectively passed by the separate auxiliary core whose control coil is open circuited and impeded by the short circuiting of the auxiliary core forming the other series magnetic circuit.

The foregoing and other advantages, objects, and novel features of this invention, as well as the invention itself, both as to organization and mode of operation may be best understood from the following description when read in connection with the accompanying drawings, in which like reference numerals refer to like parts, and in which.

Figure 1:
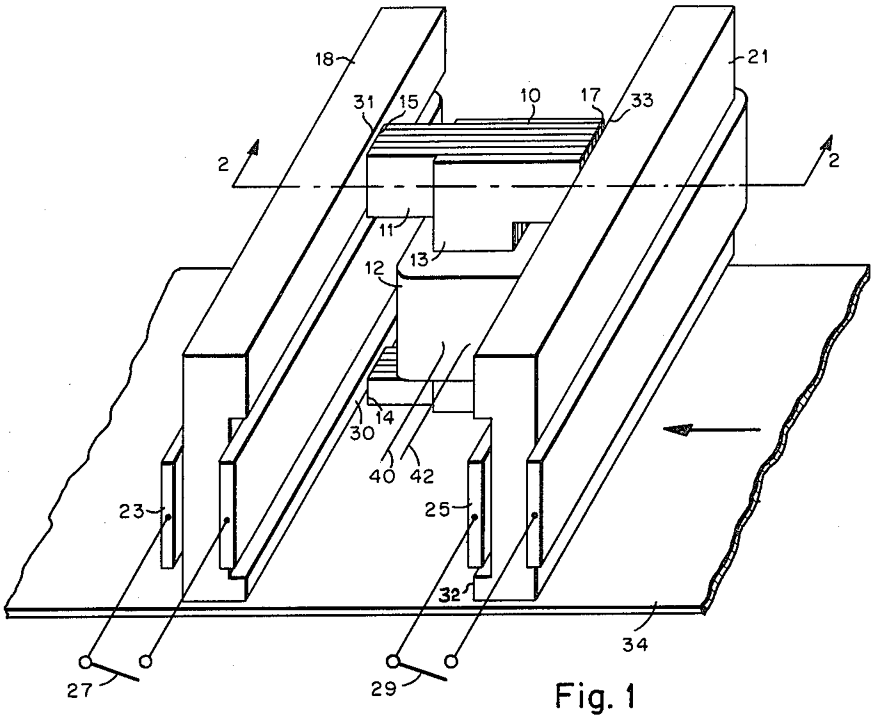
FIGURE 1 is a perspective view of a magnetic head structure embodying this invention.
Figure 2:
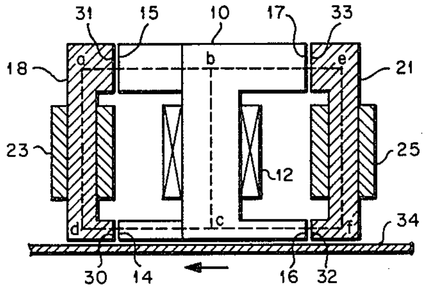
FIGURE 2 is a cross section view taken along line 2—2 of FIGURE 1.
Figure 2A:
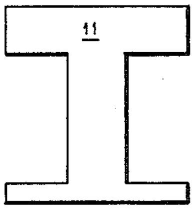

FIGURE 2*a* is a side view of the shape of the H laminations utilized in the structure of FIGURE 1.

Figure 2B:
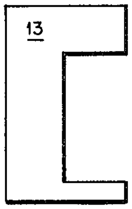

FIGURE 2*b* is a side view of the shape of the C laminations utilized in the structure of FIGURE 1.

Figure 3:
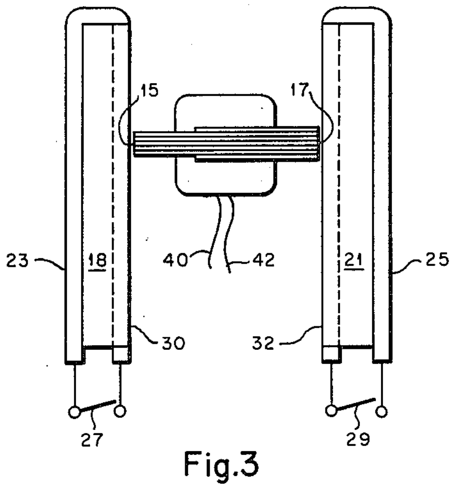

FIGURE 3 is a top view of the novel magnetic head structure of FIGURE 1.

Figure 4:
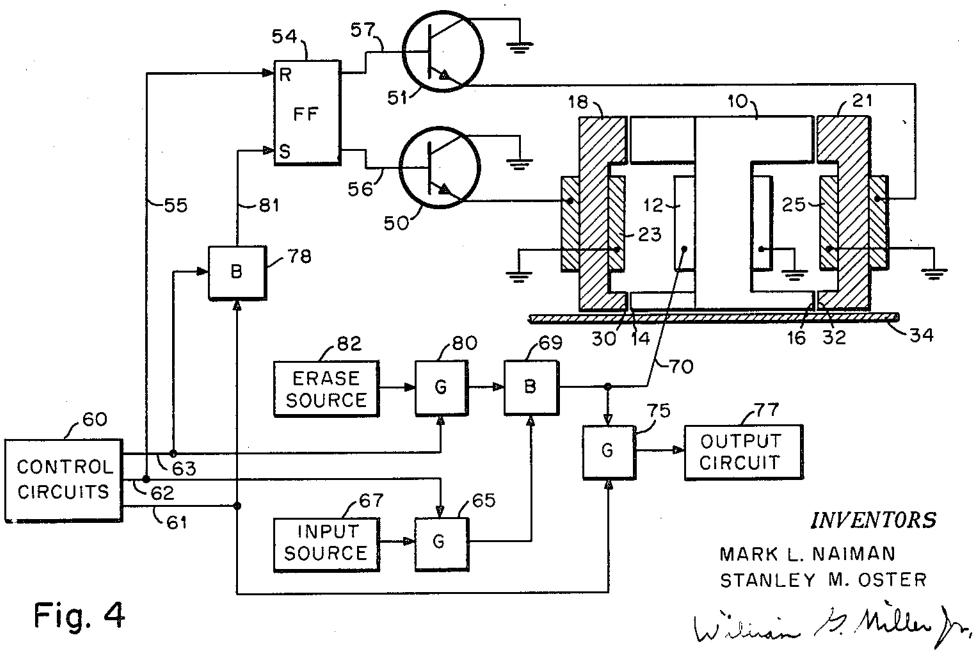

FIGURE 4 is a block diagram showing a control circuit for utilizing the head structure of FIGURE 1.

Figure 5:
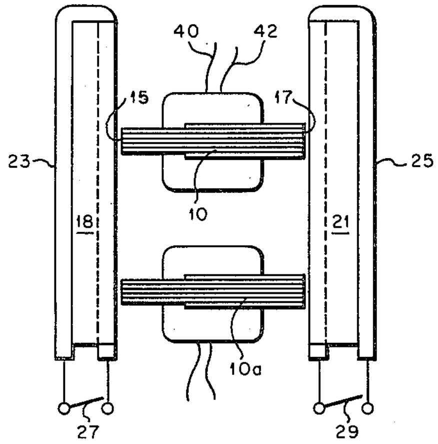

FIGURE 5 is a top view of the novel magnetic head structure showing the use of several central cores with a single auxiliary core on each side.

The structural arrangement of one embodiment of this invention is shown in FIGURES 1, 2 and 3 wherein a central core 10 having pole faces 14, 15, 16, 17 is linked by a transducer coil or winding 12. In juxtaposition with the core 10 are separate auxiliary cores 18 and 21 which are respectively linked by low impedance coils 23 and 25 and which each have pairs of pole faces 30, 31 and 32, 33 closely spaced opposite the pole faces 14, 15, 16 and 17 respectively of the central core 10. These cores 10, 18 and 21 form two series magnetic circuits; namely, *abcd* and *befc*. These magnetic circuits have a common portion *bc* in the central core 10. This central core structure 10 having the common portion, the path *bc*, is built up from a number of H laminations 11 shown in FIGURE 2*a* of ferromagnetic material having a relatively high magnetic permeability and a low retentivity. This stack of H laminations is flanked on each side by C laminations 13 of similar material, shown in FIGURE 2*b*. There is thus provided a central laminated core structure 10 having two pole faces 16, 17 of greater width than the other two faces 14, 15. The pole faces 14 and 16 which are next to the record member 34 are smaller in height and, therefore, have less area than the other pole faces 15 and 17; this arrangement tends to increase the fringing effect and hence the recording density. As an alternative to the laminated structure, the central core 10 may be cast of ferrite material to have a similar overall shape with one end wider than the other. The transducer coil 12 links both the C and H laminations of the core structure as shown in FIGURES 1, 2 and 3. The core structure thus constructed provides a pair of pole faces 14 and 16 on the side of the transducer coil 12 next to the record member and another pair of pole faces 15 and 17 on the other side. The energization of the transducer coil 12 will cause the pole faces making up each pair to assume the same polarity.

The auxiliary core structures 18 and 21 preferably have a width considerably greater than that of pole faces 14 and 16. These auxiliary cores 18 and 21 as well as the central core 10 are, for example, composed of metallic or ferrite magnetic material. The windings 23 and 25 which are preferably low impedance windings and are formed, for example, of a heavy copper conductor or a plurality of smaller conductors. The coils 23 and 25 are connected at their end terminals with switches 27 and 29, respectively. Upon selective closure of these switches 27, 29, they form low impedance circuits with the corresponding coils 23 and 25. The switches 27 and 29, shown as simple mechanical switches, could also be any of the well known electronic switching circuits.

The respective pole faces 14 and 16 are spaced from the confronting pole faces 30 and 32 of the auxiliary cores 18 and 21 in a manner to produce non-magnetic gaps between the respective pole faces.

The central core 10 and auxiliary cores 18 and 21 may be held together by a frame designed to receive and position the cores with suitable spacing. The structure may then be potted in a plastic material, for example, to firmly fix the relative positions of the respective parts.

In utilizing the magnetic head structure of FIGURE 1, a magnetizable record member 34 shown as magnetic tape is passed transversely across the respective gaps between pole faces 16, 32 and 14, 30, as for example, in the direction shown by the arrow in FIGURES 1 and 2. Suitable tape drives and guiding devices to maintain the relative positions of tape 34 and the head are well known in the art.

As is well known in the art, the transporting of the magnetizable member 34 across the adjacent gaps of the magnetic heads will cause any fringing flux existing across these gaps in response to energization of transducer coil 12 by an input signal thereto to produce a corresponding magnetization on the record member thereby performing a recording function. If the transducer coil 12 is not energized, a magnetic record previously impressed upon the record member may induce in the magnetic circuits of the head structure the necessary flux changes to produce signals in the transducer coil 12 corresponding to the signals which originally produced the record to thereby perform a reading function. Likewise, a steady flux at one of the gaps adjacent the recording member will remove previously recorded flux patterns to perform an erasing function.

In one mode of operation, the magnetic head structure of FIGURE 1 may be utilized in a manner whereby the gap having a width covering the relatively narrow channel, between the confronting pole faces 14 and 30, can be utilized for recording on the record member and the gap having a width covering the relatively wider channel, between the confronting pole faces 16 and 32, can be selectively utilized for either reproducing the previously recorded information or for erasing it. By utilizing the narrow-channel gap for the recording function and the wide-channel gap for the reproducing function, it is assured that a maximum signal will be produced in transducer coil 12 during reproduction in spite of any small change in the relative position of the record member and the magnetic head between the recording and reproducing of the signal. This mode of operation may be accomplished by selectively shorting the appropriate coils 23 and 25. For example, when it is desired to record on the record member 34 in accordance with this mode of operation, the switch 29 is closed to short circuit the low impedance coil 25 linking the auxiliary core 21. This shorting of low impedance coil 25 will have the effect of inhibiting any change in flux and, thereby, the establishment of magnetic flux in the magnetic circuit *befc*. Thus, the gap formed by the confronting pole faces 16 and 32 is rendered ineffective to produce any record on the record member. At the same time, switch 27 will be opened so that the coil 23 is in an open circuit, and flux is thus allowed to change and to be established in the magnetic circuit *abcd* in response to an energization of the transducer coil 12 as by the application of the signals to be recorded to the conductors 40 and 42. The flux thus established is effective to produce in the record member 32 a flux pattern forming a magnetic record corresponding to the energizing current through transducer coil 12.

When it is desired either to reproduce previously recorded information or to erase it from the record member 34, the switch 27 is closed to inhibit any change in, and, thereby, the production of flux in the magnetic circuit *abcd*. The narrow-channel gap formed by the pole faces 14 and 30 is, therefore, ineffective to induce in transducer coil 12 any signal in response to the flux pattern of the magnetic record carried by record member 34. The switch 29 will in this case be opened so that the gap between pole faces 16 and 32 is effective to produce in the magnetic circuit *befc* a change in flux in response to the magnetic record carried by record member 34 when the transducer coil 12 is not energized, but instead is connected to act as a reproducing element. The flux thus induced will produce a potential in the transducer coil 12 corresponding to the magnetic record being read. On the other hand, if the transducer coil 12 is energized through conductors 40 and 42 by an external erasing signal source, such as D.C. source, the gap 16, 32 will be effective to erase from the record member 34 any previously recorded signals. Utilizing the wide-channel gap for erasing ensures erasure of the entire recorded signal regardless of small changes in the positioning of the record member 34 with respect to the magnetic head, and specifically gap 16, 32.

A second mode of operation which may be utilized with the magnetic head structure of FIGURES 1 and 2 is that which utilizes the narrow-channel gap 14, 30 for the reproducing or reading function and the wide-channel gap 16, 32 for the recording function with the erasing of previously recorded material being accomplished by the recording of new information. In accordance with this mode of operation, the recording function may be carried out by supplying to conductors 40 and 42 the signal to be recorded while simultaneously maintaining the switch 27 in a closed position and the switch 29 in an open position thus making the narrow-channel gap 14, 30 ineffective and the wide-channel gap 16, 32 the effective one. Subsequent reading of the recorded information can be accomplished by maintaining the switch 27 in an open position and the switch 29 in a closed position so that the magnetic record is effective to produce in the narrow-channel gap 14, 30 a flux which will induce a corresponding signal in the transducer coil 12, and hence in the conductors 40 and 42, in accordance with the information being reproduced.

When utilizing this latter mode of operation, the recorded band or channel is wider than that which is covered by the gap involved in reproduction or reading of the recorded information. The difference in gap widths is equal to or greater than the repositioning error to be tolerated in this mode of operation as in the preceding one. Thus, small errors in the relative positions of the record member 34 and the magnetic head structure during the reproducing function as compared with the relative positions during the recording function will be ineffective to alter the signal produced. Using this mode of operation, no unerased signal is reproduced.

Modification of the structure illustrated in FIGURES 1 and 2 can be made to utilize the novel features of this invention. These may include, for example, the auxiliary core 18 constructed to be of a relatively thin material having a high permeability such as a high permeability ferrite. Such material is easily saturated and, therefore, if the central core 10 and the auxiliary core 21 are constructed of a material of lower premeability, such as permalloy, it is possible to record only at the gap formed by pole faces 16 and 32. The high permeability of the auxiliary core 18 prevents the gap 14, 30 from recording a signal on the record member 34 of any significant strength, however, this gap can be used to perform the reading operation. The recording function would be performed by the gap formed by the faces 16, 32 and recording with this gap would also be effective to erase any signals produced by the saturated flux in gap 14, 30. Using this mode of operation would make the coil 23 unnecessary.

The necessary control circuitry for providing the reading, writing and erasing functions of the head structure of FIGURE 1 in accordance with one suggested mode of operation is shown in FIGURE 4. In FIGURE 4, the transistors 50 and 51 are utilized to perform the switching function of switches 27 and 29 respectively of FIGURE 1. These transistors selectively provide a low impedance path through the respective coils 23 and 25 in dependence upon the supply of a positive biasing potential to their respective bases by the outputs of flip-flop 54. Flip-flop 54 may consist of any of a number of known flip-flop circuits capable of producing the necessary positive potential on lines 56 in response to a set input or alternatively a comparable potential on line 57 in response to a reset input.

The control circuit 60 supplies an output on either line 61, 62, or 63 in dependence upon the function to be performed; that is, read, write, or erase, respectively. For example, if it is desired to read an input into coil 12 for recording purposes, line 62 is energized. Energization of line 62 in turn causes the resetting of the flip-flop 54 by way of line 55 to make transistor 51 conductive and thus produce a low impedance circuit through the transistor and associated coil 25. Simultaneously, the signal on line 62 will also be supplied to gate 65 which will allow the gating of input signals from input source 67 through to buffer 69 and thence via line 70 to coil 12. The input from input source 67 will then energize coil 12 causing corresponding writing on the record member 34 at the gap formed between the pole faces 14 and 30 since the flux will be allowed to change in the auxiliary core 18 due to the high impedance provided by transistor 50. No significant flux change will be produced in the gap between the pole faces 16 and 32 since the low impedances of transistor 51 will prevent flux change in the auxiliary core 21 by providing a short circuit across coil 25.

The reading operation will be effected by a signal on line 61 from the control circuit 60 which is supplied to gate 75 so that any signal induced in coil 12 will be allowed to flow via line 70 through gate 75 to the output circuit 77.

The signal on line 61 will likewise be passed through buffer 78 to set flip-flop 54 and thereby bias transistor 50 to a conductive condition. The transistor 51 is simultaneously changed from a conducting state to a high impedance state. The conductive condition of transistor 50 produces a short circuit across coil 23 to prevent flux change in the auxiliary core 18, thus the reading function is performed at the gap between the pole faces 16 and 32.

If it is desired to perform the erasing function, a signal is supplied by the control circuit 60 on line 63. This signal is supplied to gate 80 thereby allowing the erasing signal from erase source 82 to flow through gate 80, buffer 69, and line 70 to coil 12. It will be noted that a signal on line 63 is also supplied to buffer 78 and thence to the set input of flip-flop 54 by way of line 81. Flip-flop 54 having been set, the signal calling for the erase function will cause flip-flop 54 to bias transistor 50 via line 56 to the conducting state so that it will be effectively providing a short circuit across coil 23. The energized coil 12 will then erase the record member 34 by means of the flux across the gap between pole faces 16 and 32 resulting from core 21 having its associated winding 25 open circuited and an erase signal being provided by erase source 82.

By changing the interconnections between the control circuits of the several gates and the buffers of FIGURE 4, the head structure of FIGURE 1 can be utilized in the other modes of operation previously mentioned.

The auxiliary cores 18 and 21, of FIGURES 1 and 3, are shown with a width sufficient to accommodate a plurality of central cores 10 to provide recording, reproduction, and erasing on a number of parallel channels. For simplicity of illustration, only one central core 10 is shown, however, it will be understood that any number of central cores such as core 10 may be spaced along the width of cores 18 and 21 to provide the desired number of parallel channels on record member 34. This is shown in FIGURE 5 where a second core 10*a* similar to core 10 is shown aligned with core 10 and also abutting the auxiliary cores 18 and 21.

Utilizing the central core 10 and the auixiliary cores 18 and 21, as described, makes possible the assembly of the entire core structure with a low degree of precision, for the pole faces 30–33 of the auxiliary cores can be wider than the central core to allow a margin for error in alignment of the central core. Any moderate error in alignment does not reduce the effective dimensions of the pole faces and does not adversely affect the functioning of the magnetic head as a whole. The particular structure shown for central core 10 determines accurately the relative positions of the respective gaps 14, 30 and 16, 32 eliminating difficult alignment procedures in fabrication of multiple head assemblies.

In accordance with this invention, a new and improved magnetic head structure is provided for selectively effecting the recording, reproducing, and erasing functions over channels of different widths while utilizing a single transducer coil in a head structure which does not require high accuracy in the positioning of its parts.

What is claimed is:

1. A magnetic head comprising a first magnetizable core having a first and second pole face, a transducer coil linking said first core so that both said first and said second pole faces are on the same side of said coil, a second magnetizable core oriented to form with said first core a first series magnetic circuit linking said transducer coil, said second core having a pole face confronting said first pole face and displaced therefrom to form a non-magnetic gap, a first control circuit including a coil linking said second core, a third magnetizable core oriented to form with said first core a second series magnetic circuit linking said transducer coil, said third core having a pole face confronting said second pole face and displaced therefrom to form a non-magnetic gap, a second control circuit including a coil linking said third core, means for selectively controlling the impedance of said first and second control coil circuits to control the flux changes at the corresponding gaps produced by energization of said transducer coil.

2. A magnetic head for recording and reproducing on a magnetic record member comprising a magnetizable core structure of relatively high permeability and low-magnetic retentivity, said core structure forming a first and second series magnetic circuit each scanning said record member and having a common core length, each of said series circuits having a non-magnetic gap therein adjacent said record member, a transducer coil linking said common core length, a first and second control coil each linking only one of the respective series circuits for determining the effectiveness of the gaps in each of said series circuits for the recording and reproduction with said magnetic record member.

3. A magnetic head comprising a magnetizable core structure forming first and second series magnetic circuits each having a separate non-magnetic gap therein and oriented to scan a common area of an associated record member, said circuits having a common portion, a transducer coil linking said common portion, a first and second control coil each linking another portion of the respective first and second series magnetic circuits, means for selectively controlling the impedance of each of said control coils to control the relationship between the flux change in each of said gaps during the reading of said record member and the resulting energization of said transducer coil.

4. A magnetic head comprising a magnetizable core having a first and second series magnetic circuit with a common portion, a transducer coil linking said common portion, and first and second control circuits having separate coils each linking another portion of the respective series circuits, and a non-magnetic region interposed in each of said series circuits between one end of said transducer coil and the respective control coil to form a recording gap in each of said circuits, each of said recording gaps being oriented to scan a common area of an associated record member, means for selectively controlling the impedance of each of said control coil circuits thereby controlling the flux in the corresponding recording gap resulting from energization of said transducer coil.

5. A magnetic head for recording and reproducing information on a magnetizable record member comprising a first magnetizable core having a first and second pole face, said first pole face having a dimension transverse to the direction of travel of the record member greater than that of said second pole face, a transducer coil linking said first core in manner to provide a like polarity of magnetization at both said first and second pole faces in response to energization of said transducer coil, a second and third magnetizable core each in a different series magnetic circuit with that portion of said first core linked by said transducer coil and each having a pole face opposite said first and second pole faces respectively and displaced therefrom in a direction longitudinal to the direction of travel of the record member, a separate control coil linking said second and said third cores, and means for selectively connecting one of said control coils to form a low impedance circuit therefrom while maintaining the other of said control coils in a high impedance circuit to thereby control the effectiveness of the corresponding confronting pole faces in recording on and reproducing from the record member by said transducer coil.

6. A magnetic head assembly for recording and reproducing a magnetic record on a plurality of parallel channels of a magnetizable record member comprising a plurality of electromagnetic transducers each having a central magnetizable core and a transducer coil linking said core, each of said magnetizable cores having a first and second pair of poles with each pair having poles on opposite sides of the corresponding transducer coil and facing in same direction and said pairs respectively facing in opposite directions, a first magnetizable core displaced from said pairs of poles facing in one direction to form gaps therewith and provide a path for flux therethrough, a second magnetizable core displaced from said pairs of poles facing in an opposite direction to form gaps therewith and provide a path for flux therethrough, and separate low impedance control coils linking said first and said second cores, means for selectively shorting said control coils to inhibit the change of flux through said first or said second cores.

7. A magnetic head for recording and reproducing a magnetic record on a record member comprising a magnetizable core structure having a first and second series magnetic circuit, each of said series magnetic circuits having a separate non-magnetic gap for operative communication with the record member, a transducer coil linking both said first and second series magnetic circuits, a separate control coil linking each of said series magnetic circuits individually, and means for producing a low impedance current path through a selected one of said control coils for controlling the relationship between the flux in said gaps and the energization of a corresponding transducer coil.

8. A magnetic head structure as set forth in claim 7 in which the gap of one of said series magnetic circuits has a dimension transverse the record member which is greater than the same dimension of the gap of the other of said series magnetic circuits.

9. A magnetic head for recording and reproducing a magnetic record on a record member, said head and member being relatively movable, said head comprising a first unitary magnetizable core structure having first and second pole faces of different dimension transverse to the direction of relative motion for sweeping channels of different widths, and having a second and third core structure respectively forming third and fourth pole faces confronting said first and second pole faces and in spaced relation thereto for providing corresponding non-magnetic gaps therewith, said third and fourth pole faces having widths at least equal to said confronting first and second pole faces respectively, and a transducer coil linking said magnetizable core structure.

10. A magnetic head for recording and reproducing information on a moving recording member comprising a first magnetizable core having a first and second pole face each scanning a common area of said record member, said first pole face having a dimension transverse to the direction of motion of the record member which is smaller than the same dimension on said second pole face, a transducer coil linking said first core so that both said first and said second pole faces are on the same side of said coil, a second magnetizable core in series magnetic circuit with said first core and having a pole face confronting said first pole face and displaced therefrom to form a gap, a control coil linking said second core, a third magnetizable core in series magnetic circuit with said first core and having a pole face confronting said second pole face and displaced therefrom to form a gap, a control coil linking said third core, means for connecting said controlled coil linking said second core in short circuit connection during a period for recording on the record member and means for connecting said control coil linking said third core in short circuit connection during a period for reproducing from the record member.

11. A magnetic head for recording and reproducing information on a moving record member comprising a first magnetizable core having a first and second pole face each scanning a common area of said record member, said first pole face having a dimension transverse to the direction of motion of the record member which is smaller than the same dimension on said second pole face, a transducer coil linking said first core so that both said first and said second pole faces are on the same side of said coil, a second magnetizable core in series magnetic circuit with said first core and having a pole face confronting said first pole face and displaced therefrom to form a gap, a control coil linking said second core, a third magnetizable core in series magnetic circuit with said first core and having a pole face confronting said second pole face and displaced therefrom to form a gap, a control coil linking said third core, means for connecting said controlled coil linking said second core in short circuit connection during a period for reproducing from the record member and means for connecting said control coil linking said third core in short circuit connection during a period for recording on the record member.

12. A magnetic head assembly for recording and reproducing a plurality of channels of information in magnetic form on a magnetizable record member comprising a first core structure for each of said channels, said first core structure having two pairs of oppositely facing pole faces, the pole faces of said pairs which face in one direction having a dimension transverse to the direction of travel of said record member greater than the same dimensions of the pole faces of each pair facing in the opposite direction, the pole face of one of said pairs being oriented in recording relationship to said record member, a transducer coil linking said first core so that each of said pairs of pole faces is on only one side of the portion of said first core linked by said transducer coil, a second and third core each having two pole faces oriented to confront respectively pole faces of each of said pairs facing in one direction, a separate low impedance current conductor linking each of said second and third cores, means for selectively establishing a short circuit across either of said low impedance current conductors to thereby prevent flux change in the magnetic circuit including the core linked by said conductor and said first core, the absence of a short circuit across the low impedance current conductor of the other of said second and third cores allowing flux change in the magnetic circuit including said other of said second or third cores and said first core in response to energization of said transducer coil in accordance with signals to be recorded on said record member during recording and in accordance with the magnetic record on said record member during reproduction of the information on said record member.

References Cited in the file of this patent

UNITED STATES PATENTS

| | | |
|---|---|---|
| 2,418,542 | Camras | Apr. 8, 1947 |
| 2,786,897 | Schware | Mar. 26, 1957 |
| 2,885,488 | Andrews | May 5, 1959 |
| 2,915,591 | Wanlass et al. | Dec. 1, 1959 |
| 2,928,079 | McNut | Mar. 8 1960 |
| 2,961,645 | Dickinson | Nov. 22, 1960 |
| 2,963,690 | Holman | Dec. 6, 1960 |

FOREIGN PATENTS

| | | |
|---|---|---|
| 776,401 | Great Britain | June 5, 1957 |